July 3, 1923.
V. YORK
KEY ADJUSTER FOR CONNECTING ROD BEARINGS
Filed Aug. 28, 1922
1,460,877
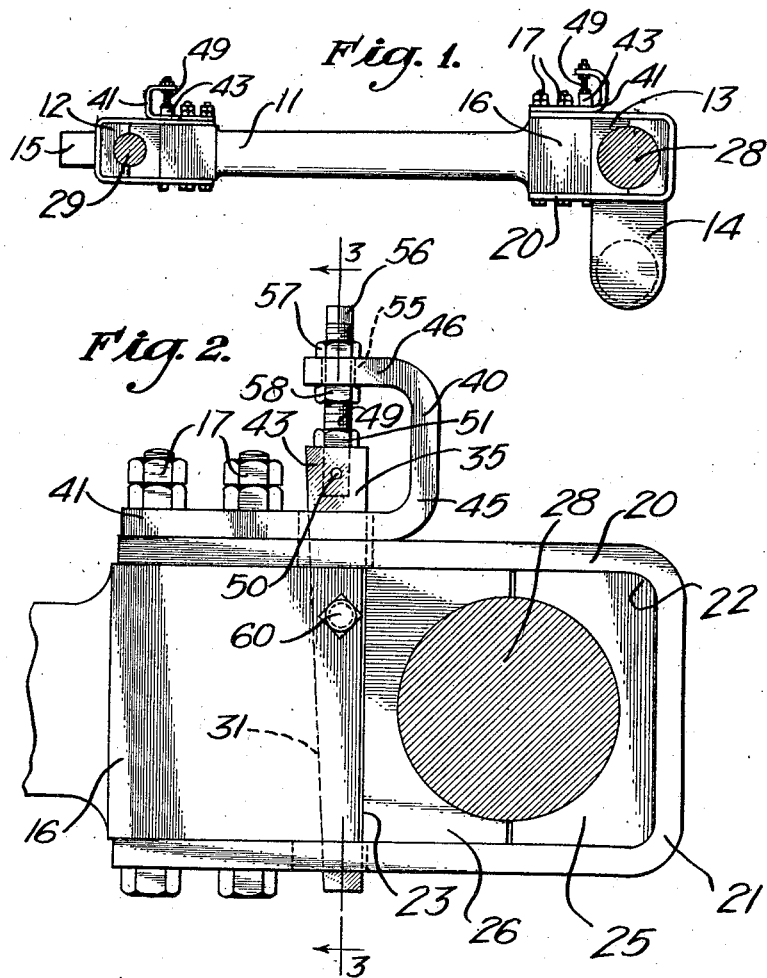
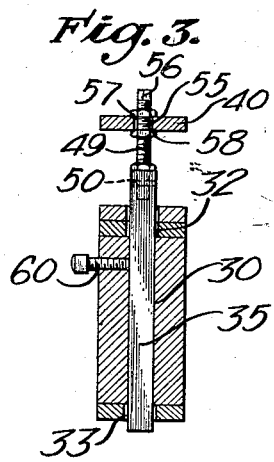
INVENTOR:
VICTOR YORK
BY
Graham + Hins
ATTORNEY.

Patented July 3, 1923.

1,460,877

UNITED STATES PATENT OFFICE.

VICTOR YORK, OF LOS ANGELES, CALIFORNIA.

KEY ADJUSTER FOR CONNECTING-ROD BEARINGS.

Application filed August 28, 1922. Serial No. 584,920.

*To all whom it may concern:*

Be it known that I, VICTOR YORK, a citizen of the United States, residing at Los Angeles, in the county of Los Angeles and State of California, have invented a new and useful Key Adjuster for Connecting-Rod Bearings, of which the following is a specification.

My invention consists of a device which may be employed to adjust the bearing key in bearings employing split bearing blocks or brasses. The device, however, is of particular utility with the adjustments of bearings employed in the connecting rods of oil well drilling engines.

It is an object of the invention to provide a bracket which may be conveniently secured upon the bearing retainer without the necessity of changing the form or present equipment or the bearing retainer, and an adjustment screw adapted to be mounted in the end of the bearing key and provided with adjustment nuts adapted to bear against the inner and outer faces of the bracket to adjust the position of the screw relative to the bracket and by so doing adjust the position of the key.

It is a further object of the invention to provide a device of this character which will provide a very fine adjustment of the bearing key.

The especial advantages of the invention and further objects thereof will be made evident hereinafter.

Referring to the drawing which is for illustrative purposes only,

Fig. 1 is a view showing a drilling engine connecting rod equipped with a bearing key adjuster embodying the features of my invention.

Fig. 2 is an enlarged elevation of the crank bearing end of the connecting rod shown in Fig. 1.

Fig. 3 is a section taken substantially upon a plane represented by the line 3—3 of Fig. 2.

The connecting rod 11, having bearings 12 and 13 to which the use of my invention is particularly adapted, is of the type commonly employed in drilling engines, such connecting rods linking the movement of the crank 14 with the crosshead 15. The ends of the connecting rod 11 are enlarged and squared up in the form of a head 16. By means of bolts 17 which extend through the head 16, a strap 20 is secured upon the head 16, with the loop 21 thereof extending outwardly from the head so that a space 22 is provided between the strap and the forward face 23 of the head 16, thus forming a retainer for the bearing blocks 25 and 26 which receive the crank pin 28, or the wrist pin 29 of the cross head.

A vertical slot 30 is formed in the face 23 of the head 16 having a sloped bottom, as indicated at 31. Through holes 32 and 33 provided in the strap 20 a tapered key 35 is placed. By moving the tapered key downwardly in the slot 30, the inner bearing block 26 is forced outwardly toward the block 25 and the pressure or fit of the blocks upon the crank shaft 28 may thereby be adjusted.

My invention provides a bracket 40 which is formed from a bar of flat steel shaped into a form providing a mounting plate 41, having holes therein through which the bolts 17 may pass and a rectangular hole 42 through which the end 43 of the key 35 may extend. The bracket is bent outwardly away from the strap 20, as indicated at 45, and the outer end 46 thereof is bent back over the end of the key 43. A hole 48 drilled into the end 43 of the key 35 receives the end of a screw 49, which is secured by a pin 50 and locked rigidly by a lock nut 51. This screw 49 extends through a hole 55 in the end 46 of the bracket 40 and has its outer end squared as indicated at 56. Lock nuts 57 and 58 are threaded upon the screw 49 in the positions shown, the lock nut 57 bearing upon the outer face of the bracket end 46, and the lock nut 58 bearing upon the inner face thereof. By screwing the nuts 57 and 58 upwardly or downwardly upon the screw 49, the screw and key attached thereto may be drawn in or out of the slot 30 as required to adjust the bearing blocks 25 and 26. The set screw 60 which is ordinarily provided with this type of bearing may, or may not be, as desired, clamped down upon the key 35 after the adjustment has been made through the manipulation of the adjustment nuts 57 and 58.

Although I have described my invention in use with a particular form of bearing, the principles thereof may be employed with various types of bearings in which the key is used for the adjustment of the bearing blocks and I, therefore, do not wish to be limited to the hereinbefore disclosed application of the invention.

I claim as my invention:

1. In an adjustable bearing of the class described, the combination of: a body forming a head; a strap so bent that the ends thereof fit over said head; bolts securing said strap to said head in a position providing a space between said strap and said head; bearing blocks in said space; a tapered key operating between said head and the innermost of said blocks for forcing said blocks together, said key extending through an opening in said strap; a bracket secured against said strap by said bolts, said bracket extending outwardly along said strap, there being an opening in said bracket through which said key may extend, the outer end of said bracket being bent back over the end of said key and having a hole therein; a screw extending from the end of said key and passing through said hole in said bracket; and an adjustment nut upon said screw on each side of said over-extending end of said bracket, for adjusting the position of said screw relative to said bracket.

2. In an adjustable bearing of the class described, the combination of: a body forming a head; a strap so bent that the ends thereof fit over said head; bolts securing said strap to said head in a position providing a space between said strap and said head; bearing blocks in said space; a tapered key operating between said head and the innermost of said blocks for forcing said blocks together, said key extending through an opening in said strap; a bracket secured against said strap by said bolts, the end of said bracket extending over the end of said key and having a hole therein; a screw extending from the end of said key and passing through said hole in said bracket; and an adjustment nut upon said screw on each side of said over extending end of said bracket, for adjusting the position of said screw relative to said bracket.

3. In an adjustable bearing of the class described, the combination of: a body forming a head; a strap so bent that the ends thereof fit over said head; bolts securing said strap to said head in a position providing a space between said strap and said head; bearing blocks in said space; a tapered key operating between said head and the innermost of said blocks for forcing said blocks together, said key extending through an opening in said strap; a bracket secured against said strap by said bolts, said bracket extending outwardly along said strap, there being an opening in said bracket through which said key may extend, the outer end of said bracket being bent back over the end of said key and having a hole therein; and screw means operating through said hole in said over-extending end of said bracket and engaging the end of said key, for adjusting the position of said key.

In testimony whereof, I have hereunto set my hand at Los Angeles, California, this 22nd day of August, 1922.

VICTOR YORK.